(12) United States Patent
Harrell et al.

(10) Patent No.: US 6,298,908 B1
(45) Date of Patent: Oct. 9, 2001

(54) HEAT EXCHANGE ASSEMBLY AND SEAL THEREFOR

(75) Inventors: Jeffrey A. Harrell, Clinton Township; Steven C. Barnett, Oxford, both of MI (US)

(73) Assignee: Edwards Industries, Inc., Royal Oak, MI (US)

( * ) Notice: Subject to any disclaimer, the term of this patent is extended or adjusted under 35 U.S.C. 154(b) by 354 days.

(21) Appl. No.: 08/847,111

(22) Filed: May 1, 1997

(51) Int. Cl.$^7$ .................................. F28F 7/00; F16J 15/02
(52) U.S. Cl. .......................... 165/69; 277/640; 277/648; 277/651; 277/944
(58) Field of Search ............................... 165/67, 69, 127; 277/640, 648, 651, 944

(56) References Cited

U.S. PATENT DOCUMENTS

| | | | |
|---|---|---|---|
| 3,121,467 | * | 2/1964 | Bryant ................................. 165/69 X |
| 3,123,170 | * | 3/1964 | Bryant ................................. 165/69 X |
| 3,635,480 | * | 1/1972 | Bain et al. ............................ 277/651 |
| 3,771,801 | * | 11/1973 | Burke ................................. 277/944 X |
| 4,066,269 | * | 1/1978 | Linne .................................. 277/944 X |
| 4,333,522 | * | 6/1982 | Brune ...................................... 165/69 |
| 4,579,184 | * | 4/1986 | Hiramoto ........................... 165/67 X |
| 4,730,836 | * | 3/1988 | Miller et al. ...................... 277/640 X |
| 4,770,234 | * | 9/1988 | Hiraoka et al. ......................... 165/69 |
| 5,046,554 | * | 9/1991 | Iwasaki et al. .................. 165/127 X |
| 5,213,342 | * | 5/1993 | Weber ............................... 277/648 X |
| 5,289,658 | * | 3/1994 | Lusen et al. ...................... 277/651 X |
| 5,632,328 | * | 5/1997 | Sawyer et al. ......................... 165/69 |

* cited by examiner

Primary Examiner—Leonard Leo
(74) Attorney, Agent, or Firm—Lalos & Keegan

(57) ABSTRACT

A heat exchanger assembly suitable for use in a heating, ventilating and air conditioning system of a vehicle comprising a housing, a heat exchanger core disposed in the housing and spaced from the housing to provide a peripheral spacing between the core and the housing and a seal disposed in the peripheral spacing including a first section engaging a portion of the core and having a first hardness and a second section integrally molded with the first section engaging a portion of the housing and having a second hardness less than the first hardness.

34 Claims, 2 Drawing Sheets

HEAT EXCHANGE ASSEMBLY AND SEAL THEREFOR

This invention relates to an improved heat exchanger assembly suitable for use in heating, ventilating and air conditioning systems of vehicles. The invention further contemplates a novel seal for such an assembly.

BACKGROUND OF THE INVENTION

In heating, ventilating and air conditioning (HVAC) systems for vehicles, there typically is provided a housing or duct system having an outside air inlet, an inside air inlet and an inside air outlet communicating with the passenger compartment of the vehicle, a blower for circulating airflow through the housing and various doors or panels with suitable controls operable by vehicle occupants for directing the flow of air through the housing and into and out of the passenger compartment. Air flowing through such systems typically is heated by a heater core positioned in such system housing and operatively connected to the engine cooling system, and is cooled by an evaporator core also provided in the system housing and operatively connected to the air conditioning system of the vehicle. Such core members essentially consist of heat exchangers and function to either impart or extract heat energy to and from air flowing therethrough.

To maximize heat exchange efficiency and eliminate airflow noise or "whistling" caused by air passing through the space normally provided between the periphery of the core member and the surrounding housing wall, it has been the conventional practice in the automotive industry to provide a peripheral seal in such space. Traditionally such seals have consisted of bulky, open cell foam materials compressed between the core member and surrounding housing.

The traditional type of seal used for sealing core members used in HVAC systems has been found to be unsatisfactory for a number of reasons. Such type of seal is susceptible to moisture accumulation which results in offensive odors contaminating air introduced into the passenger compartment of the vehicle. In service for prolonged periods, it may be subject to deterioration, developing air passageways through which airflow may flow and thus circumvent the core member, correspondingly reducing heat exchange efficiency. Such seals further require some form of adhesive for securing them to the core member during installation which not only adversely affects the installation time in the assembly of the components and installation of such systems in vehicles but further adversely affects the quality of such assemblies.

Accordingly, it has been found to be desirable to provide an assembly of the type described having a seal disposed between the core and surrounding housing which will obviate the aforementioned disadvantages of prior art seals and thus provide an effective and efficient heat exchanger assembly for a vehicle which will not provide any offensive odors or unpleasant noises causing discomfort to vehicle occupants.

SUMMARY OF THE INVENTION

The present invention provides an improved heat exchange assembly suitable for installation in a vehicle for heating or cooling the passenger compartment of the vehicle generally comprising a housing, a heat exchanger core disposed in the housing and spaced therefrom to provide a peripheral spacing between the core member and the housing and a seal disposed in the peripheral spacing including a first section engaging a portion of the core member and having first hardness and a second section integrally molded with the first section engaging a portion of the housing and having second hardness less than the first hardness. The first section of the seal which imparts rigidity to the seal to facilitate the mounting of the seal on the core member and accommodate the installation of the core member with the seal mounted thereon into the housing, preferably is formed of a thermoplastic or thermosetting plastic material such as a polypropylene-based resinous material provided with a fiberglass filler, has a durometer hardness in the range of 40 to 90 Shore D and is provided with means for mechanically securing the seal to the core member. The second sealing section of the seal is molded integrally with the first or base section of the seal, is also formed of a thermoplastic or thermosetting plastic material such as a thermoplastic polyolefinic elastomer consisting of fully cured elastomer particles disposed in a continuous thermoplastic matrix and preferably has a durometer hardness in the range of 20 to 90 Shore A.

DESCRIPTION OF AN EMBODIMENT OF THE INVENTION

Figure 1:
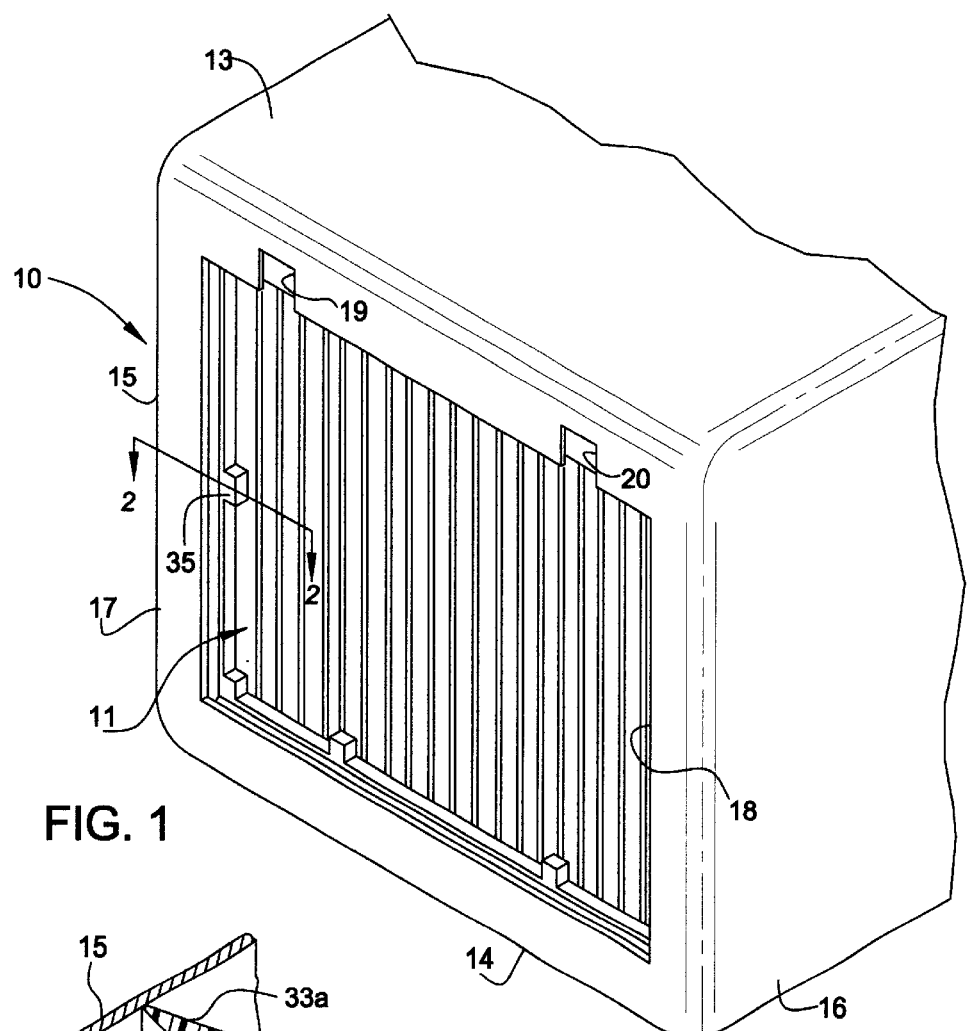
FIG. 1 is a perspective view of a portion of a heat exchanger assembly comprising a component of a heating, ventilating and air conditioning system of a vehicle.

Referring to FIG. 1 of the drawings, there is illustrated a heat exchange assembly embodying the present invention which comprises a portion of a heating, ventilating and air conditioning system installed in a vehicle for providing outside fresh air, heated air or cooled air to the passenger compartment of a vehicle upon operation of certain controls on the interior instrument panel of the vehicle by vehicle occupants. The assembly generally consists of a housing 10 forming a portion of the HVAC system, a core member 11 positioned within the housing member and spaced therefrom to provide a peripheral space between the core member and the housing and a seal 12 disposed in the peripheral space between, the core member and the housing, secured to the core member and engaging the housing in sealing engagement.

The housing includes upper and lower wall sections 13 and 14, sidewall sections 15 and 16 and front wall 17 provided with an opening 18. The housing is formed of any suitable metallic plastic or other material sufficient to support core member 11, and configured to channel airflow through core member 11, through opening 18 and into the passenger compartment of the vehicle. Core member 11 consists of either a heater core connected to the engine cooling system or an evaporator core as a component of the air conditioning system of the vehicle. The core member is of a conventional construction consisting of metallic fluid conduits disposed in heat exchange relationship with airflow passing through the core member, having a pair of inlet and outlet conduits extending through a pair of openings 19 and 20 formed in front wall 17. The core member is positioned within housing 10 so that the upper and lower sides of the core member are spaced from upper and lower wall sections 13 and 14 of the housing, the sides thereof are spaced from sidewall sections 15 and 16 of the housing and the front side thereof is spaced from front wall section 17 of the housing, providing the peripheral space accommodating seal 12.

Figure 2:
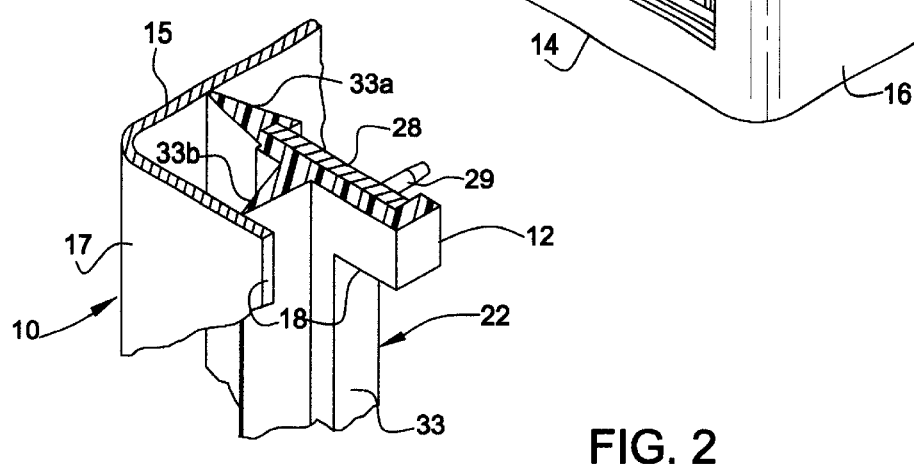
FIG. 2 is an enlarged, cross-sectional view taken along line 2,2 in FIG. 1.
Figure 3:
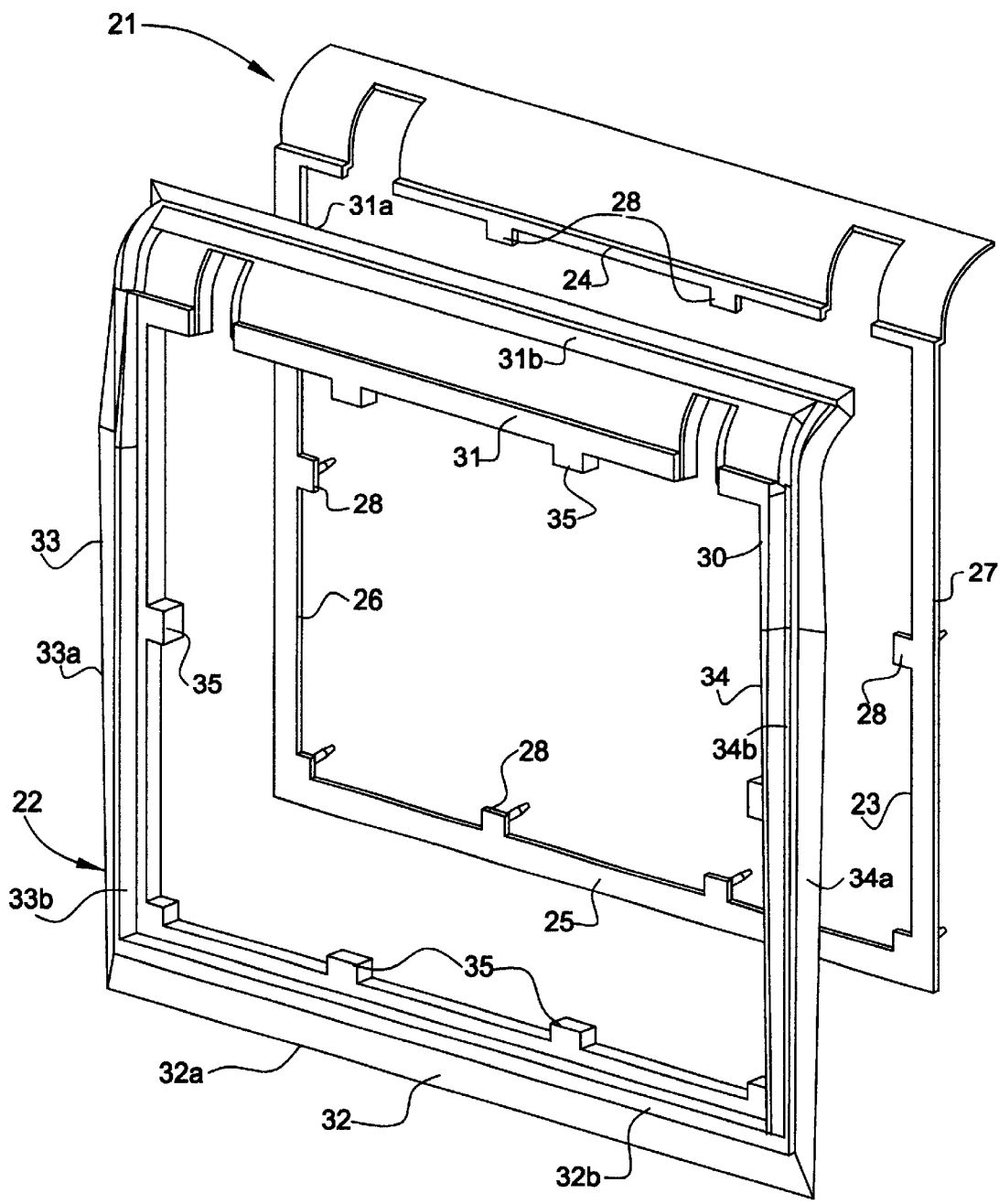
FIG. 3 is a perspective view of the seal provided in the assembly shown in FIGS. 1 and 2, illustrating the sections thereof normally integrally molded together, in exploded relation.

As best shown in FIGS. 2 and 3, seal 12 consists of a first or base section 21 and a second or sealing section 22 molded integrally with base section 21. The base section is provided with an opening 23 and includes upper and lower portions 24 and 25 and side portions 26 and 27 which engage a peripheral portion of the front face of the core member. Such section further is provided with inwardly projecting segments 28 spaced about the periphery of opening 23 having rearwardly projecting, integrally molded barb-type elements 29 which are adapted to be received in registered openings of the periphery of the front face of the core member for securing the seal to the core member.

Sealing section 22 is configured similarly to base section 21, having an opening 30 therein registering with opening 23 in the base member and including upper and lower portions 31 and 32 integrally molded with upper and lower sections 24 and 25 of the base section and side sections 33 and 34 which are integrally molded to side portions 26 and 27 of the base section. Sealing section 22 further is provided with inwardly projecting segments 35 which are aligned with and integrally molded to inwardly projecting segments 28 of the base section.

Each of portions 31 through 34 of the sealing section is provided with outwardly and forwardly projecting seal contact point segments which engage inner surfaces of the upper and lower, side and front walls of the housing in sealing relation. More specifically, portion 31 of section 22 includes projecting segments 31a and 31b which engage inner surfaces of wall sections 13 and 17 of the housing, portion 32 includes segments 32a and 32b which engage inner surfaces of wall sections 14 and 17 of the housing, portion 33 includes segments 33a and 33b which engage inner surfaces of wall sections 15 and 17 of the housing and portion 34 includes segments 34a and 34b which engage inner surfaces of wall sections 16 and 17 of the housing.

Preferably, base section 21 is formed of a thermoplastic material and sealing section 22 is formed of a thermoplastic polyolefinic elastomer consisting of fully cured elastomer particles dispersed in a continuous thermoplastic matrix. The base section may be formed either of virgin polypropylene material or a polypropylene material provided with certain additives. Fiberglass may be added to enhance the strength and rigidity of the material. Mica may be added to enhance rigidity to a greater extent but would have the added effect of reducing tensile and shear strength. The durometer hardness of the base section should be in the range of 40 to 90 Shore D and preferably is 65+5 Shore D.

The sealing section of the seal preferably is formed of KRATON G or SANTOPRENE. KRATON G is a high performance thermoplastic polyolefinic elastomer manufactured and sold by the Shell Chemical Company of Houston, Tex. It is a styrene-ethylene/butylenestyrene (SEBS) block polymer which exhibits a high temperature, chemical, oxidation and weather resistance. SANTOPRENE is a high performance thermoplastic polyolefinic elastomer manufactured and sold by the Monsanto Polymer Products Company of Akron, Ohio. It is a fully vulcanized polyolefinic material produced by a proprietary vulcanization process by Monsanto. The durometer hardness of the sealing section should be in the range of 20 to 90 Shore D. Durometer hardnesses of 35±5 Shore A and 55±5 Shore A have been found to be most suitable for the seal section.

The dual durometer seal as described may be formed in a conventional injection molding machine provided with a fixed mold section having first and second cavities, and a second mold section displaceable between first and second positions in mating relation to the first mold section, having at least one cavity cooperable with the first cavity of the fixed mold section when the second mold section is in the first position to provide a cavity having the configuration of the base section of the seal, and a second cavity cooperable with the second cavity of the fixed mold section when the second mold section is in the second position to provide a cavity having the configuration of the entire seal. With the displaceable mold section in such first position, molten material of which the base section of the seal is formed is injected into the mold cavity to form the base section of the seal. Upon the base section of the seal having thus been shot and as the material of such section begins to cure, the second section is displaced to the second position and the material forming the sealing section of the seal is injected into the mold cavity containing the base section so that the sealing section of the seal is molded integrally with the base section thereof.

In the use of the aforementioned materials for molding the seal as described, the molten polypropylene-based resinous material is first injected into the first set of cavities at a temperature in the range of 370 to 400° F., preferably 380 to 390° F., and allowed to cool only to a partially solidified state sufficient to maintain its shape while positioned in the mold, at a temperature in the range of about 300 to 340° F., preferably 325 to 335° F. The molten SANTOPRENE material, at a temperature in the range of 370 to 420° F., preferably 375 to 390° F., is then injected into the second set of cavities containing the polypropylene-based resinous material in the partially solidified state to cause the two materials to bond together and provide a dual durometer member.

In the assembly and installation of the assembly as described, the seal is first mounted on the front face of the core member by positioning the seal in front of the core member with the barb elements registered with the openings about the periphery of the core member, and then the barb elements are forced into the openings in the core member to cause the seal to engage the core member about the periphery of the front face thereof. With the seal thus securely attached to the front face of the core member, the core member may be inserted into the housing and positioned so that seal contact point segments 31a, 32a, 33a and 34a engage the upper, lower and sidewalls of the housing and seal contact point segments 31b, 32b, 33b and 34b engage the front wall of the housing, as partially illustrated in FIG. 2. Under such conditions, the peripheral space between the core member and the housing will be effectively sealed. The base section of the seal functions to provide rigidity of the sealing section not only to facilitate the initial mounting of the seal on the core member but also to maintain the seal contact point segments in sealing engagement with the housing walls. The sealing section of the seal is provided with a sufficient resiliency to allow deformation and a biasing action of the section to firmly engage the walls of the housing and assure an effective and prolonged contact therewith to prevent any leakage. Furthermore, the configuration of the seal section of the seal in essence provides a double seal thus further assuring a positive seal in the peripheral space between the core member and the housing.

It thus will be appreciated that the seal as described not only provides an effective seal between the core member and housing of the assembly over the service life of the assembly but further facilitates the attachment of the seal in the core member and installation of the core member into the housing, and eliminates any objectionable noise and offensive odors attendant to conventional sealing arrangements in such assemblies.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. A heat exchange assembly comprising:
a housing;
a heat exchanger core disposed in said housing and spaced from said housing to provide a peripheral spacing between said core and said housing; and
a seal disposed in said peripheral spacing including a first section engaging a portion of said core and having a first hardness and a second section integrally molded with said first section engaging a portion of said housing and having a second hardness less than said first hardness.

2. An assembly according to claim 1 wherein said first section of said seal includes means for securing said seal to said core.

3. An assembly according to claim 2 wherein said securing means comprises means for mechanically securing said seal to said core.

4. An assembly according to claim 3 wherein said securing means comprises at least one barb portion cooperable with an opening in a wall of said core for securing said seal to said core.

5. As assembly according to claim 1 wherein said second section includes a first seal contact point portion engaging a first wall section of said housing and a second seal contact point portion engaging a second wall portion of said housing.

6. An assembly according to claim 5 wherein each of said seal contact point portions is provided with a converging cross-sectional configuration.

7. An assembly according to claim 5 wherein said seal contact point portions project in directions spaced substantially 90° apart.

8. An assembly according to claim 1 wherein said first section of said seal has a durometer hardness in the range of 40 to 90 Shore D and said second section of said seal has a durometer hardness in the range of 20 to 90 Shore A.

9. An assembly according to claim 1 wherein said first section of said seal has a durometer hardness of 65±5 Shore D and said second section of said seal has a durometer hardness of 35±5 Shore A.

10. An assembly according to claim 1 wherein said seal is formed of one of a class consisting of a thermoplastic and thermosetting plastic material.

11. An assembly according to claim 1 wherein said first section of said seal is formed of a polypropylene-based resinous material.

12. An assembly according to claim 11 wherein said first section of said seal is provided with a durometer hardness in the range of 40 to 90 Shore D.

13. An assembly according to claim 11 wherein said polypropylene-based resinous material is provided with a fiberglass additive.

14. An assembly according to claim 11 wherein said polypropylene-based resinous material includes a fiberglass addition of 10% by weight.

15. An assembly according to claim 1 wherein said second section of said seal is formed of a thermoplastic polyolefinic elastomer consisting of fully cured elastomer particles dispersed in a continuous plastic matrix.

16. An assembly according to claim 15 wherein said second section of said seal has a durometer hardness in the range of 20 to 90 Shore A.

17. An assembly according to claim 1 wherein said heat exchanger core comprises a heater core connectable to an engine cooling system.

18. An assembly according to claim 1 wherein said heat exchanger core comprises an evaporator core of a vehicle air conditioning system.

19. A seal for a peripheral space disposed between a housing and a core disposed in said housing comprising a member disposable in said peripheral space including a first section engageable with a portion of said core and having a first hardness and a second section integrally molded with said first section engageable with a portion of said housing and having a second hardness less than said first hardness, when said seal is disposed in said peripheral space.

20. A seal according to claim 19 wherein said first section includes means for securing said seal to said core.

21. A seal according to claim 20 wherein said securing means comprises means for mechanically securing said seal to said core.

22. A seal assembly according to claim 21 wherein said securing means comprises at least one barb portion cooperable with an opening in a wall of said core for securing said seal to said core.

23. A seal according to claim 19 wherein said second section includes a first seal contact point portion engageable with a first wall portion of said housing and a second seal contact point portion engageable with a second wall portion of said housing.

24. A seal according to claim 23 wherein each of said seal contact point portions is provided with a converging cross-sectional configuration.

25. A seal assembly according to claim 23 wherein said seal contact point portions project in directions spaced substantially 90° apart.

26. A seal assembly according to claim 19 wherein said first section of said seal has a durometer hardness in the range of 40 to 90 Shore D and said second section of said seal has a durometer hardness in the range of 20 to 90 Shore A.

27. A seal according to claim 19 wherein said first section of said seal has a durometer hardness of 65±5 Shore D and said second section of said seal has a durometer hardness of 35±5 Shore A.

28. An assembly according to claim 19 wherein said seal is formed of one of a class consisting of a thermoplastic and thermosetting plastic materials.

29. A seal according to claim 19 wherein said first section of said seal is formed of a polypropylene-based resinous material.

30. A seal assembly according to claim 29 wherein said first section of said seal is provided with a durometer hardness in the range of 40 to 90 Shore D.

31. A seal assembly according to claim 29 wherein said polypropylene-based resinous material is provided with a fiberglass additive.

32. A seal according to claim 29 wherein said polypropylene-based resinous material includes a fiberglass additive of 10% by weight.

33. A seal assembly according to claim 19 wherein said second section of said seal is formed of a thermoplastic polyolefinic elastomer consisting of fully cured elastomer particles dispersed in a continuous thermoplastic matrix.

34. A seal according to claim 33 wherein said second section of said seal is provided with a durometer hardness in the range of 20 to 90 Shore A.

* * * * *